US011254203B2

(12) United States Patent
Bouffier

(10) Patent No.: US 11,254,203 B2
(45) Date of Patent: Feb. 22, 2022

(54) LIQUID CONTAINER FOR A MOTOR VEHICLE AND METHOD FOR PRODUCING A LIQUID CONTAINER

(71) Applicant: KAUTEX TEXTRON GMBH & CO. KG, Bonn (DE)

(72) Inventor: Roman Bouffier, Koenigswinter (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 16/759,420

(22) PCT Filed: Oct. 22, 2018

(86) PCT No.: PCT/EP2018/078852
§ 371 (c)(1),
(2) Date: Apr. 27, 2020

(87) PCT Pub. No.: WO2019/081410
PCT Pub. Date: May 2, 2019

(65) Prior Publication Data
US 2020/0376954 A1   Dec. 3, 2020

(30) Foreign Application Priority Data
Oct. 27, 2017   (DE) .................... 10 2017 125 264.9

(51) Int. Cl.
*B60K 15/03*      (2006.01)
*B29C 45/14*      (2006.01)
(Continued)

(52) U.S. Cl.
CPC .. *B60K 15/03177* (2013.01); *B29C 45/14336* (2013.01); *B29C 45/14786* (2013.01);
(Continued)

(58) Field of Classification Search
CPC .... B60K 15/03177; B60K 2015/03493; B60K 2015/03046; B29C 45/14336;
(Continued)

(56) References Cited

U.S. PATENT DOCUMENTS 5,344,038 A * 9/1994 Freeman ............. B29C 33/0016
220/562
6,613,408 B1 * 9/2003 Short ..................... B32B 27/08
428/36.6
(Continued)

FOREIGN PATENT DOCUMENTS

DE   102009059100   6/2011
DE   102013004931   9/2014
(Continued)

OTHER PUBLICATIONS

International Preliminary Report on Patentability, dated Jan. 22, 2020, received in corresponding PCT Application No. PCT/EP2018/078852.
(Continued)

*Primary Examiner* — Stephen J Castellano
(74) *Attorney, Agent, or Firm* — Grossman, Tucker, Perreault & Pfleger, PLLC

(57) ABSTRACT

A liquid container for a motor vehicle, comprising a storage volume for storing a liquid and comprising at least one shell, which at least partially delimits the storage volume, wherein the shell has been produced at least partially in an injection molding process, the shell has a barrier film, the shell has a reinforcing element, which is formed at least partially or completely of a thermoplastic fiber-reinforced composite material, the shell has a single-part or multi-part support structure, which is formed at least partially or completely of an injection-molded material, the barrier film is integrally bonded to the reinforcing element, and the barrier film and
(Continued)

the reinforcing element are each integrally bonded to the support structure.

14 Claims, 6 Drawing Sheets

(51) Int. Cl.
  *B29C 45/16* (2006.01)
  *B32B 27/32* (2006.01)
  *B29L 31/00* (2006.01)

(52) U.S. Cl.
  CPC .......... *B29C 45/1671* (2013.01); *B32B 27/32* (2013.01); *B29L 2031/7172* (2013.01); *B60K 2015/03046* (2013.01); *B60K 2015/03493* (2013.01)

(58) Field of Classification Search
  CPC ........... B29C 45/14786; B29C 45/1671; B29L 2031/7172; B32B 27/32
  USPC .......................................... 220/62.19, 62.22
  See application file for complete search history.

(56) References Cited

U.S. PATENT DOCUMENTS

| | | |
|---|---|---|
| 9,987,797 B2 | 6/2018 | Karsch |
| 2004/0149759 A1 | 8/2004 | Moser et al. |
| 2008/0290331 A1* | 11/2008 | Wang ...................... C08L 77/02 |
| | | 252/609 |
| 2010/0237080 A1 | 9/2010 | Gebert et al. |
| 2015/0069057 A1 | 3/2015 | Guitton et al. |
| 2015/0102026 A1 | 4/2015 | Parola et al. |
| 2016/0059477 A1 | 3/2016 | Karsch |
| 2016/0354957 A1 | 12/2016 | Lemasson et al. |
| 2018/0149312 A1 | 5/2018 | Criel et al. |

FOREIGN PATENT DOCUMENTS

| | | |
|---|---|---|
| EP | 0454978 | 11/1991 |
| EP | 2544881 | 9/2017 |
| KR | 1020130028775 | 3/2013 |
| KR | 1020160051835 | 5/2016 |

OTHER PUBLICATIONS

International Search Report dated Mar. 8, 2019, received in corresponding PCT Application No. PCT/EP2018/078852.

* cited by examiner

LIQUID CONTAINER FOR A MOTOR VEHICLE AND METHOD FOR PRODUCING A LIQUID CONTAINER

This application is the national stage (Rule 371) of international application No. PCT/EP2018/078852 filed 22 Oct. 2018.

FIELD

The present invention relates to a liquid container for a motor vehicle and to a method for producing a liquid container.

BACKGROUND

In motor vehicles, liquid containers serve to store operating liquids such as fuel, aqueous urea solution for exhaust post-treatment, or water for cooling the engine or for water injection.

In particular plastics material fuel containers have to satisfy a plurality of legal provisions as regards crash safety, maximum admissible fuel evaporation emission, and prevention of fuel leaks under all operating conditions. This is conventionally achieved by way of a multi-layer wall construction produced by co-extrusion blow-molding. In this context, for example an EVOH (ethylene vinyl alcohol copolymer) permeation barrier is enclosed by HDPE (high-density polyethylene) layers on two faces in the manner of a sandwich structure, adhesion promotor layers of LDPE (low-density polyethylene) optionally being used for connecting the central EVOH barrier layer to the external HDPE cover layers.

At the same time, there is the requirement that a plastics material fuel container of this type should have as low a weight as possible so as further to reduce the fuel consumption and thus also the carbon dioxide emission of a motor vehicle.

However, the weight-saving potential for plastics material fuel containers produced by extrusion blow-molding is heavily limited on the basis of the process, as a result of the stretching processes for achieving the required minimum wall thickness, the required minimum wall thicknesses arising for example from dimensional stability requirements and fire requirements on the container to be produced.

By way of injection molding, more uniform wall thicknesses can be achieved, in such a way that the required minimum wall thickness can be achieved with low material usage, in such a way that the weight of a plastics material fuel container produced by injection molding can be reduced overall by comparison with a plastics material fuel container produced by co-extrusion blow-molding. Thus, a wall thickness of a plastics material fuel container produced by injection molding may for example be 3 mm, while a comparable plastics material fuel container produced by co-extrusion blow-molding has a wall thickness of 5 mm. Furthermore, functional components of a plastics material fuel container can be integrated cost-effectively by injection molding.

One challenge in the production of a liquid container, in particular a plastics material fuel container, is to produce a wall that both satisfies the barrier function for minimizing the hydrocarbon emission and simultaneously meets the mechanical component requirements on dimensional stability in operation and on crash safety.

In this context, conflicting goals arise as regards the mechanical properties. On the one hand, the plastics material fuel container should not deform substantially under the static load of its inherent weight and of the liquid received, it being necessary to prevent sagging of the wall up to temperatures of 80° C. High rigidity of the plastics material fuel container is thus required. On the other hand, high deformability under collision stresses should be provided, in such a way that, even at low temperatures up to −40° C., the structural integrity of the fuel bladder is ensured so as to prevent fuel from escaping in a crash scenario.

As regards the barrier function for minimizing hydrocarbon emission, the five- or six-layer wall construction known from co-extrusion blow-molding, with a base material of HDPE and a barrier layer of EVOH, cannot readily be implemented by injection molding. No base material is known that, as a monolayer, both satisfies the required barrier function and meets the above-described mechanical requirements.

Against this background, the invention is based on the technical problem of specifying a liquid container for a motor vehicle and a method for producing a liquid container for a motor vehicle that at least partially meet the above-described requirements and in particular make possible a lightweight, dimensionally stable, crash-safe, minimized-emission liquid container.

SUMMARY

A first aspect of the invention relates to a liquid container for a motor vehicle, comprising a storage volume for storing a liquid and comprising at least one shell, which at least partially delimits the storage volume, wherein the shell has been produced at least partially in an injection molding process, the shell has a barrier film, the shell has a reinforcing element, which is formed at least partially or completely of a thermoplastic fiber-reinforced composite material, the shell has a single-part or multi-part support structure, which is formed at least partially or completely of an injection-molded material, the barrier film is integrally bonded to the reinforcing element, and the barrier film and the reinforcing element are each integrally bonded to the support structure.

Because the injection-molded material is combined with functionally optimized elements in a targeted manner, a more lightweight liquid container can be specified, which is dimensionally stable, crash-safe and minimized in terms of emissions. In this context, the barrier function is due to the barrier film. The reinforcing element and the support structure make the liquid container dimensionally stable and crash-safe.

The liquid container may be a plastics material fuel container for a motor vehicle driven by a combustion engine.

The barrier film may be set up as a permeation barrier for minimizing hydrocarbon permeation through the shell. The barrier film may be constructed single-layer or multi-layer.

The liquid container, in particular plastics material container, may have a wall thickness of approximately 4 mm or less. It will be appreciated that the liquid container may have reinforcing ribs or integrated terminal shapes, such as pipe terminals or the like, in the region of which the wall thickness is locally greater than 4 mm.

The support structure of the liquid container may comprise or consist of an injection-molded material, it being possible for the support structure to have been produced at least partially or completely by back-injecting or molding on the barrier film and the reinforcing element using the injection-molded material.

The support structure may be formed positioned cohesively in a single piece on the barrier film and the support structure. Alternatively, the support structure may have a plurality of separate segments spaced apart from one another, in other words local material moldings or back-injections, that are integrally connected to the barrier film and/or the reinforcing structure. The material use can thus be concentrated on the structurally significant regions.

It may be provided that the shell has a single reinforcing element. It may be provided that the shell has two or more reinforcing elements. The shell can thus be locally reinforced in a targeted manner so as to ensure crash safety and dimensional stability of the liquid container.

It may be provided that the reinforcing element or at least one reinforcing element is arranged in a region of the shell that forms the container base in the final, mounted state of the liquid container in the motor vehicle. Sagging of the container base under the load of the stored liquid can thus be prevented.

In a further embodiment of the liquid container, the reinforcing element is arranged, at least in portions or completely, between the barrier film and the support structure. In addition to the integral connection, the reinforcing element can thus additionally be received in a positive fit, at least in portions, between the barrier film and the support structure or be enclosed or embedded, at least in portions, between the barrier film and the support structure on two faces in the manner of a sandwich structure. Reliable cohesion between the barrier film, the support structure and the reinforcing element can thus be ensured.

Alternatively or in addition, it may be provided that the barrier film partially or completely covers a face of the reinforcing element. Accordingly, it may for example be provided that a face of the reinforcing element facing the barrier film is covered by the barrier film over the entire area, the barrier film in particular being positioned flush or without play against the reinforcing element. Reliable cohesion between the barrier film and the support structure can thus be ensured.

Alternatively or in addition, it may be provided that the support structure covers a face of the reinforcing element at least in portions or completely. Accordingly, it may for example be provided that a face of the reinforcing element facing the barrier film is covered by the support structure over the entire area, the support structure in particular being positioned flush or without play against the reinforcing element. Reliable cohesion between the reinforcing element and the support structure can thus be ensured.

Alternatively, it may be provided that the support structure only partially covers a face of the reinforcing element remote from the barrier film. For example, the reinforcing element may be framed by the support structure, in a manner overlapping at the edge, while part of the face of the reinforcing element remote from the barrier film is exposed and not covered by the support structure. Thus, the material use of the support structure can be kept low and weight can be saved.

In a further embodiment of the liquid container, the shell is a first half-shell, which together with a second half-shell delimits the storage volume, the second half-shell having a wall construction comprising a barrier film, a reinforcing element and a support structure. It will be appreciated that the first half-shell and the second half-shell may differ from one another in shape.

The first half-shell may be a lower shell, which in the final, mounted state is arranged on the roadway side in a vehicle. The second half-shell may be a lower shell, which is arranged on the vehicle side, on a side of the liquid container remote from the roadway.

The half-shells may be integrally interconnected, in particular welded together, along a peripherally encircling collar.

In further embodiments of the liquid container, it may be provided that merely the first shell has a reinforcing element, while the second shell has no reinforcing element. Thus, for the dimensional stability and crash safety of the liquid container, it may already be sufficient merely structurally to reinforce for example a lower shell of the liquid container using a single reinforcing element or a plurality of reinforcing elements.

The barrier layers of the half-shells may form a substantially closed barrier bladder, which substantially completely encloses the storage volume. In this context, the wording "substantially completely" takes account of the fact that a liquid container in a motor vehicle generally has one or more withdrawal openings and/or filling openings and/or ventilation openings, so as to provide the drive system with the stored liquid. Furthermore, openings or wall clearances for passing electrical lines through or for an encoder module may be provided. In the region of an opening of this type, a barrier layer is locally interrupted or cleared. The wording that the barrier layers substantially completely enclose the storage volume describes in particular the prevention of a permeation path in a connection region between the half-shells. Accordingly, terminal openings penetrating the wall of a half-shell may be provided. Terminal openings of this type and associated terminal shapes, such as pipe terminals or the like, may have been produced by injection molding and thus be an integral part of a half-shell.

In a further embodiment of the liquid container, the reinforcing element has reinforcing fibers, which are embedded in a thermoplastic plastics material matrix, the reinforcing fibers comprising glass fibers and/or aramid fibers and/or carbon fibers or the like or the reinforcing fibers consisting of glass fibers and/or aramid fibers and/or carbon fibers or the like. The reinforcing element can thus be optimally adapted to the expected operating loads and ambient conditions, in accordance with the application scenario and the position on the liquid container.

Alternatively or in addition, it may be provided that the reinforcing element has reinforcing fibers that are embedded in a thermoplastic plastics material matrix, the plastics material matrix comprising or consisting of polyamide (for example PA6, PA66, PA12 or polyphthalamide (PPA)), polyolefin (for example polypropylene (PP) or polyethylene (PE)), polyurethane (PU, in particular thermoplastic polyurethane (TPU)), polyphenylene sulfide (PPS) or the like. In this way, the reinforcing element can be optimally adapted to the expected operating loads and ambient conditions, in accordance with the application scenario and the position on the liquid container.

Alternatively or in addition, it may be provided that the reinforcing element comprises or consists of a fiber-reinforced composite plastics material reinforced with long fibers. The reinforcing element can thus be optimally adapted to the expected operating loads and ambient conditions, in accordance with the application scenario and the position on the liquid container.

Alternatively or in addition, it may be provided that the support structure comprises or consists of HDPE or a polyamide modified to be shock-resistant. The reinforcing element can thus be optimally adapted to the expected operating loads and ambient conditions, in accordance with the application scenario and the position on the liquid container.

Alternatively or in addition, it may be provided that the reinforcing element comprises or consists of an organic sheet. Two or more reinforcing elements comprising or consisting of organic sheets may be provided. If organic sheets are used, existing recourse may be had to already known material combinations and semi-finished products.

Alternatively or in addition, it may be provided that the reinforcing element comprises or is a unidirectionally reinforced strip. Thus, for example, one or more layers of a carbon fabric strip may be used as a reinforcing element. As a result of the generally flexible structure of a strip or tape of this type, the strip or tape can be adapted to the provided contour of the shell in a simple manner.

The unidirectionally reinforced strip can exit the shell laterally so as to form a strap for fastening the liquid container to a supporting structure. Thus, for example, opposite ends of the strip may exit the shell on two faces so as to make it possible to fasten or pre-fix the container on a support structure. It may be provided that the barrier film, the support structure and the reinforcing element each have a mutually chemically and thermally compatible material, so as to ensure reliable integral connection to one another.

For example, a liquid container may be specified in which the support structure comprises or consists of the material PA6 (polyamide 6), the reinforcing element comprises glass-fiber-reinforced PA6 or the reinforcing element consists of glass-fiber-reinforced PA6, and the barrier film has cover layers that comprise or consist of PA6, and the cover layers of the barrier film enclose a central layer of the barrier film, the central layer of the barrier film comprising or consisting of EVOH.

Alternatively, a liquid container may be specified in which the support structure comprises or consists of the material HDPE, the reinforcing element comprises glass-fiber-reinforced HDPE or the reinforcing element consists of glass-fiber-reinforced HDPE, and the barrier film has cover layers that comprise or consist of HDPE, the cover layers of the barrier film enclosing a central layer of the barrier film, the central layer comprising or consisting of EVOH, and an adhesion promotor layer of the barrier film being arranged between the central layer and an associated cover layer in each case, the adhesion promotor layers each comprising or consisting of LLDPE.

Alternatively, a liquid container may be specified in which the support structure comprises or consists of the material HDPE, the reinforcing element comprises glass-fiber-reinforced PA6 or the reinforcing element consists of glass-fiber-reinforced PA6, and the barrier film has cover layers that comprise or consist of HDPE, the cover layers of the barrier film enclosing a central layer of the barrier film, the central layer comprising or consisting of EVOH, and an adhesion promotor layer of the barrier film being arranged between the central layer and an associated cover layer in each case, the adhesion promotor layers each comprising or consisting of LLDPE, and an adhesion promotor layer being provided between the reinforcing element and the barrier film and/or the reinforcing element and the support structure, the adhesion promotor layer comprising or consisting of LDPE or LLDPE.

The reinforcing element may be a substantially planar plate, which is part of a base-side or cover-side wall delimiting the storage volume, the support structure forming a transition, curved at least in portions, from the base-side or cover-side wall to a side wall delimiting the storage volume. Accordingly, the support structure may have heavily curved regions, produced by injection molding, so as to form the transition between a base-side or cover-side wall and a side wall. Deformation of the reinforcing element can thus be dispensed with.

Alternatively, it may be provided that the reinforcing element is curved in one, two or three directions in space, in the manner of a free-form surface, and is part of a base-side or cover-side wall delimiting the storage volume. The reinforcing element can thus be adapted to the respectively required shape of the liquid container or to the available installation space in the final, mounted stated.

A second aspect relates to a method for producing a liquid container, comprising the method steps of:
  providing a barrier film;
  providing a reinforcing element, which is formed at least partially or completely of a thermoplastic fiber-reinforced composite material,
  integrally connecting the barrier film to the reinforcing element;
  injection-molding a support structure, the support structure being integrally connected to the reinforcing element and the support structure being integrally connected to the barrier film.

The order of the above list of method steps does not prescribe an order of the method steps for the actual process. The barrier film and the reinforcing element may thus be provided simultaneously or in succession. This equally applies to all method steps set out hereinafter, which can be combined freely within reason in terms of order and/or may take place simultaneously.

Because the injection-molded material is combined with functionally optimized elements in a targeted manner, a lightweight liquid container can be produced that is dimensionally stable, crash-safe and minimized in terms of emissions. In this context, the barrier function is substantially due to the barrier film. It will be appreciated that all further components enclosing the storage volume in principle have a barrier effect, but this is less than the barrier effect of the barrier film. The reinforcing element and the support structure make the liquid container produced by the method according to the invention dimensionally stable and crash-safe.

It may be provided that the storage volume of the liquid container is substantially delimited by two interconnected half-shells, a first half-shell having an internal barrier film arranged on the face facing the storage volume and a second half-shell likewise having an internal barrier film arranged on a face facing the storage volume. In this way, the barrier films can be reliably protected from mechanical stress and environmental influences.

Alternatively, it may be provided that the storage volume of the liquid container is substantially delimited by two interconnected half-shells, a first half-shell having an internal barrier film arranged on the face facing the storage volume and a second half-shell having an external barrier film arranged on a face remote from the storage volume. In this way, one of the barrier films, specifically the internal barrier film, can be reliably protected from mechanical stress and environmental influences. In the case of a plastics material fuel container, this may for example be a lower shell, which faces the roadway in the final, installed state, the internal arrangement of the barrier film protecting the barrier film against stone impact, for example. The external barrier film makes it possible to attach functional units to an inner face, remote from the external barrier film, of the relevant half-shell, in such a way that functional units protruding into the storage volume can be fastened without detracting from the structural integrity of the barrier film. In the case of a plastics material fuel container, this may in particular be an upper shell, which in the final, installed state is arranged on a face of the plastics material container remote from the roadway. For an upper shell of this type, damage to the external barrier film from stone impact is less likely, since the lower shell is arranged between the barrier film and the roadway and thus shields the barrier layer from the roadway.

Alternatively, it may be provided that the storage volume of the liquid container is substantially delimited by two interconnected half-shells, a first half-shell having an external barrier film arranged on a face remote from the storage volume and a second half-shell likewise having an external barrier film arranged on a face remote from the storage volume. As a result, in each case functional units can be arranged on the inner face of the half-shells facing the storage volume, without detracting from the structural integrity of the barrier films.

Irrespective of the external and/or internal arrangement of the barrier films, the barrier films may form a substantially closed barrier bladder, the barrier bladder, in the case of a plastics material fuel container, merely being locally interrupted in the region of openings for liquid supply and/or withdrawal or for ventilation. In particular, in the region of a seam location between two half-shells, the barrier films can be positioned against one another substantially without a gap or be welded together.

Alternatively, in the region of a seam location between two half-shells, the barrier films may be at a distance from one another, forming a permeation path. In the case of a plastics material fuel container, a permeation path of this type should be formed as narrow and elongate as possible so as to meet the legally prescribed emission limits. Thus, it may for example be provided that, as considered in cross section, a length of the permeation path is greater than or equal to twice the width of the permeation path, the width of the permeation path corresponding to the distance between the barrier films delimiting the permeation path and the length being measured transverse to the width.

In a further embodiment of the method, providing the barrier film comprises the following method steps:
  thermoforming the barrier film and
  positioning and fixing the barrier film in an injection-molding tool,
  the barrier film being thermoformed before the barrier film is positioned in the injection-molding tool and/or after the barrier film is positioned in the injection-molding tool.

Accordingly, before positioning, the barrier film may already be partially or completely introduced to the mold provided for the molding or back-injection. For this purpose, the barrier film is heated and shaped outside the injection-molding tool using a device separate from the injection-molding tool. For example, the barrier film may be heated in a contact-free manner, in particular using an infrared radiator or the like, and thermoformed after or during the heating. Thus, thermoforming of the barrier film within the injection-molding tool can be dispensed with completely or at least partially.

Therefore, shaping of the barrier film that brings the barrier film into the shape provided for the injection molding may take place in a device separate from the injection-molding tool, in such a way that the barrier film is merely molded or back-injected as an inlay in the injection-molding tool. Alternatively, the barrier film may be pre-shaped in a device separate from the injection-molding tool, and brought into the shape provided for molding or back-injection in a further shaping process within the injection-molding tool. Thus, the barrier film can be positioned in the injection-molding tool as a partially pre-shaped inlay, and thermoformed against a tool half.

Alternatively, it may be provided that the barrier film is completely thermoformed within the injection-molding tool. An additional device, separate from the injection-molding tool, for shaping the barrier film can thus be dispensed with.

In a further embodiment of the method, the barrier film is positioned in the injection-molding tool using a roll-to-roll feed-in. In this context, for feeding the barrier film into the injection-molding tool, at least two rolls may be arranged laterally with respect to a tool half of the injection-molding tool, so as to convey the barrier film into a region between the tool halves of the injection-molding tool. In this context, a first roll is assigned to a first face of the relevant tool half, while a second roll is assigned to a second face of the tool half remote from the first face. The roll-to-roll feed-in makes it possible in particular to pre-tension the barrier film for a subsequent thermoforming process within the injection-molding tool.

Alternatively or in addition, it may be provided that the barrier film is fixed to the injection-molding tool using a holding frame. The holding frame may have an actuator, fastened to a tool half, for opening and closing the holding frame. Thus, the barrier film can be positively and/or non-positively fixed on a tool half of the injection-molding tool in a simple manner.

Alternatively or in addition, it may be provided that the barrier film is fixed and thermoformed by generating a negative pressure in the injection-molding tool. Thus, a tool half on which the barrier film is to be held and shaped, in particular thermoformed, may have vacuum holes for suctioning the barrier film against a tool surface of the relevant tool half. As an alternative or in addition to the vacuum holes, a tool half on which the barrier film is to be fixed and shaped, in particular thermoformed, may consist at least partially or completely of an air-permeable, porous material.

In a further embodiment of the method, integrally connecting the barrier film to the reinforcing element comprises the following method steps:
  heating the reinforcing element to a temperature greater than or equal to a melting point of a plastics material matrix of the reinforcing element,
  the reinforcing element being heated before and/or during the provision of the barrier film;
  moving the reinforcing element into a region between a first tool half that receives the barrier film and a second, in particular nozzle-side, tool half,
  the reinforcing element being moved between the tool halves during or after the heating;
  integrally connecting the reinforcing element to the barrier film by pressing the heated reinforcing element against a face of the barrier film remote from the first tool half.

Because the barrier film is arranged between the tool half receiving the barrier film and the reinforcing element during the pressing of the heated reinforcing element, the reinforcing element has no direct contact with the tool half receiving the barrier film. In this way, cooling of the reinforcing element can be reduced, by comparison with direct contact thereof against a tool half, in that the barrier film thermally insulates the reinforcing element from the tool half receiving the barrier film. In this way, on the one hand a reliable integral connection between the barrier film and the reinforcing element can be formed. On the other hand, additionally, the formation of an integral connection between the reinforcing element and injection-molded material injected into the injection-molding tool is promoted, since the reinforcing element is not cooled by the contact with the tool half supporting the barrier film.

Furthermore, through one-sided contact of the barrier film on a surface of a tool half, cooling and fixing of the barrier film can be achieved, in such a way that the risk of damage to the film from the injection molding and the associated high temperatures and shear forces is reduced.

The barrier film and/or reinforcing element can in each case be heated by a contactless heating device, such as an infrared radiator or the like. An infrared radiator for heating the reinforcing element may accordingly be assigned to the reinforcing element.

A contactless heating device for heating the reinforcing element may be arranged at a distance from the injection-molding tool, in such a way that the reinforcing element is heated before it is moved into a region between the tool halves of the injection-molding tool. In this way, a reinforcing element can be prepared simultaneously with a running injection-molding cycle, for the following injection-molding cycle.

Alternatively or in addition, the contactless heating device may be arranged on a handle for gripping and moving the reinforcing element. Thus, the reinforcing element can be heated before it is moved into a region between the tool halves of the injection-molding tool and in particular simultaneously with a running injection-molding cycle, and also additionally heated further while the reinforcing element is moved into a region between the open tool halves of the injection-molding tool. In this way, the transport time of the reinforcing element from a waiting position to a pressing position between the mold halves of the tool can be used for heating the reinforcing element further or for preventing a fall in temperature during the provision to the pressing position from a waiting position. In this context, the pressing position is a position of the reinforcing element between mold halves of the injection mold from which the reinforcing element can be moved toward the barrier film to press against the barrier film or vice versa. The waiting position is a position of the reinforcing element outside the injection-molding tool, in which the reinforcing element is held ready during one injection-molding cycle for a following injection-molding cycle.

A further infrared radiator for heating the barrier film may be assigned to the barrier film.

A contactless heating device for heating the barrier film may be movable between the mold halves of the injection-molding tool when the barrier film is positioned on a tool half of the injection-molding tool. The barrier film can thus be heated by a heating device before the pressing of the heated reinforcing element.

Thus, a heat input of the heating device for heating the barrier film can be introduced to the barrier film in addition to a residual heat, the residual heat resulting from preceding thermoforming of the barrier film. A reliable integral connection can thus be formed between the barrier film and the reinforcing element.

Alternatively, the barrier film may have a sufficient temperature for integral connection to the heated reinforcing element merely as a result of a residual heat from preceding thermoforming, without additional or renewed heating being required after the thermoforming of the barrier film.

The reinforcing element and the barrier film may be heated via a single jointly used infrared radiator.

BRIEF DESCRIPTION OF THE DRAWINGS

In the following, the invention is described in greater detail by way of drawings, which illustrate an embodiment and in which, in each case schematically.

DETAILED DESCRIPTION

Figure 1:
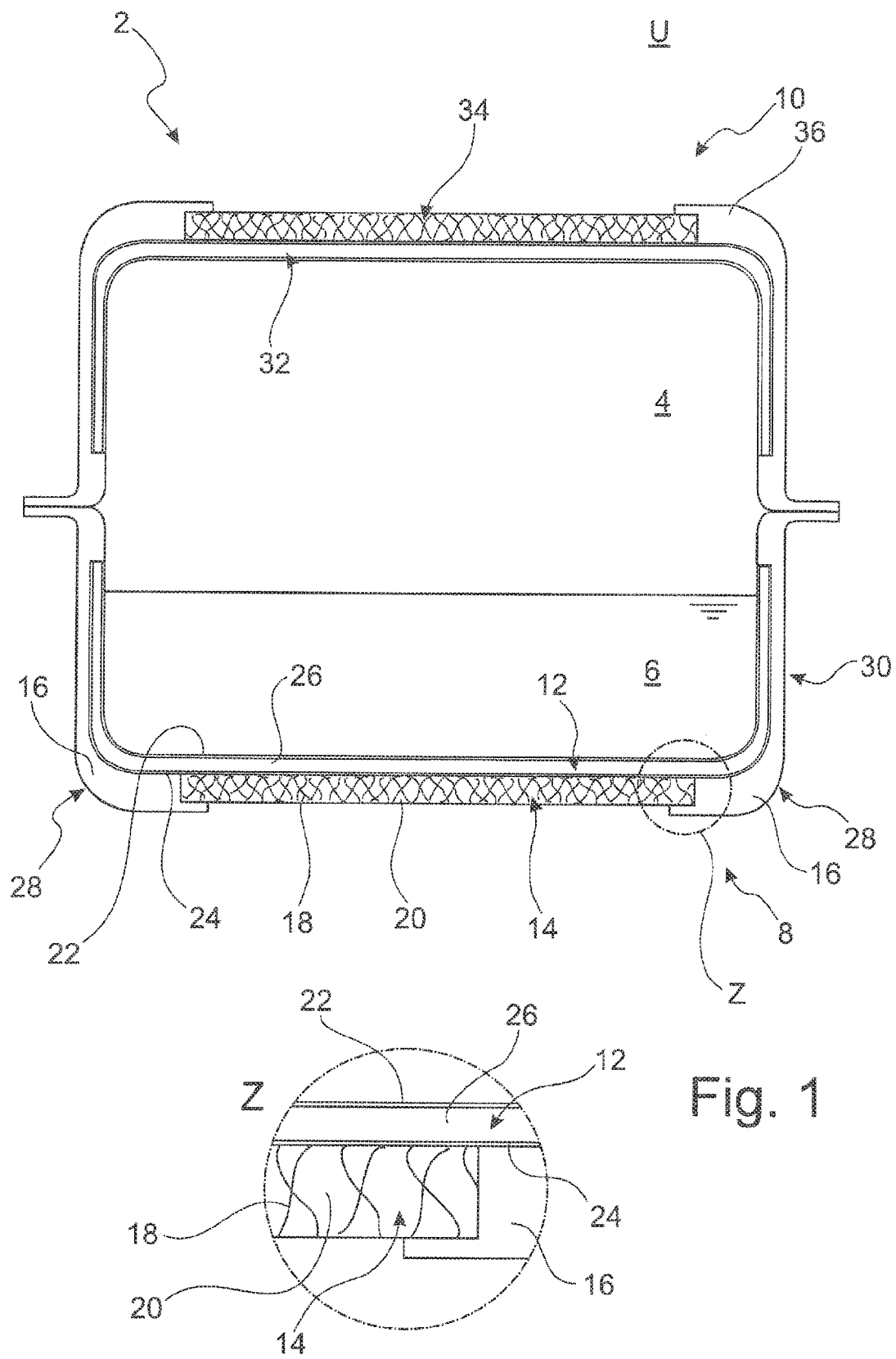
FIG. 1 is a cross section of a liquid container according to the invention.

FIG. 1 shows a liquid container 2 for a motor vehicle. In the present case, the liquid container 2 is a plastics material fuel container 2. The liquid container 2 has a storage volume 4 for storing a liquid 6. In the present case, the liquid 6 is fuel 6 for a motor driven by combustion engine.

The liquid container 2 has a first half-shell 8 and a second half-shell 10, which delimit the storage volume 4. The half-shells 8, 10 have each been produced by injection molding. In the following, the structural wall construction of the half-shells 8, 10 is described for the half-shell 8 by way of example.

The half-shell 8 has a barrier film 12, which is set up as a permeation barrier to minimize the permeation of hydrocarbons from the storage volume 4 into an environment U.

The half-shell 8 has a reinforcing element 14, which is formed of a thermoplastic fiber-reinforced material.

The half-shell 8 further has a support structure 16, which is formed of an injection-molded material.

In the present case, the half-shell 8 has been produced by injection molding, in that the barrier film 12 and the reinforcing element 14 have been positioned in an injection-molding tool as an inlay and molded using the injection-molded material of the support structure 16.

The barrier film 12 is integrally connected to the reinforcing element 14. For this purpose, the barrier film 12 and the reinforcing element 14 have been heated and welded together.

The barrier film 12 is integrally connected to the support structure 16. The barrier film 12 has been welded to the support structure 16 by the injection molding.

The reinforcing element 14 is integrally connected to the support structure 16. The reinforcing element 14 has been welded to the support structure 16 by the injection molding.

The welding of each of the barrier film 12 and the reinforcing element 14 to the support structure 16 has been achieved by molding the injection-molded material of the support structure 16 onto the reinforcing element 14 and the barrier film 12 within an injection-molding tool.

The welding between the barrier film 12 and the reinforcing element 14 has been produced before molding the support structure 16. As can be seen from the detail Z, the reinforcing element 14 is arranged, at least in portions, between the barrier film 12 and the support structure 16.

It will be appreciated that in further embodiments of the invention a shell may have a plurality of reinforcing elements, which may overlap one another or be arranged spaced apart from one another. It will further be appreciated that in further embodiments of the invention the support structure may be formed multi-part and may for example have separate segments, spaced apart from one another, of local moldings of injection-molded material on the barrier film and/or the reinforcing element.

In the present case, the reinforcing element 14 has reinforcing fibers 18 that are embedded in a thermoplastic plastics material matrix 20. In the present case, glass fibers 18 are provided as reinforcing fibers 18. In alternative embodiments of the invention, alternatively or in addition, aramid fibers and/or carbon fibers may be used as reinforcing fibers.

In the present case, the thermoplastic plastics material matrix 20 of the reinforcing element 14 consists of a polyamide (PA). In the present case, the reinforcing element 14 is reinforced with long fibers. In the present case, the support structure 16 likewise consists of a polyamide (PA).

Specifically, in the present case, the support structure 16 consists of the material PA6, the reinforcing element 14 consisting of glass-fiber-reinforced PA6. The barrier film 12 has cover layers 22, 24, which consist of PA6 and enclose a central layer 26 of the barrier film 12, the central layer 26 consisting of EVOH.

The reinforcing element 14 is a substantially planar plate 14. The reinforcing element 14 of the half-shell 8 is thus part of a base-side wall, delimiting the storage volume 4, of the half-shell 8.

The support structure 16 forms a curved transition 28 from the base-side wall to a side wall 30, delimiting the storage volume 4, of the liquid container 2.

The half-shell 10 likewise has a wall construction consisting of a barrier film 32, a reinforcing element 34 and a support structure 36.

It will be appreciated that the liquid container 2 may, in a known manner, have functional units arranged in the storage volume, such as pumps, lever encoders, valves or the like, which for improved clarity are not shown here.

Figure 2:
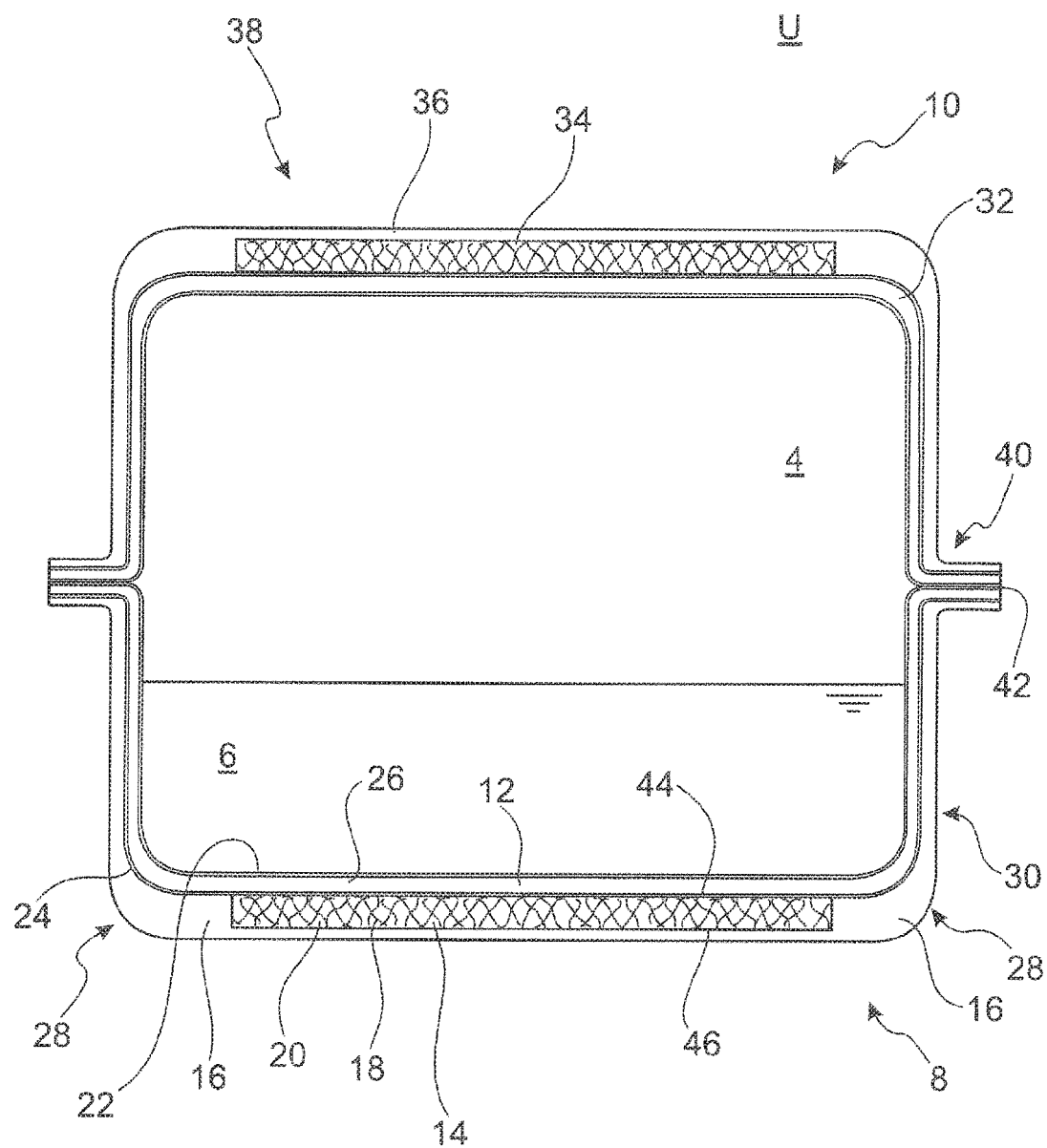
FIG. 2 is a cross section of a further liquid container according to the invention.

FIG. 2 is a cross section of a further configuration of a liquid container 38 according to the invention. For the avoidance of repetition, in relation to FIG. 2 merely the differences from the above-described embodiment of FIG. 1 are discussed, like reference numerals being assigned to like features.

In the variant of FIG. 2, the barrier films 12, 32 of the half-shells 8, 10 extend into a connection region 40 formed between the half-shells 8, 10, the half-shells 8, 10 having been welded together along a peripherally encircling collar 42.

The barrier films 12, 32 are likewise integrally interconnected in the connection region 40, in such a way that the barrier films 12, 32 form a substantially closed barrier bladder. In this context, the wording "substantially closed" takes account of the fact that the shown liquid container 38, which is a plastics material fuel container 38, has the obligatory inlet and outlet openings for filling, ventilating and liquid withdrawal, in the region of which a barrier layer is interrupted or cleared in each case so as to make fluid transfer possible. Furthermore, openings or wall clearances for passing electrical lines through or for an encoder module may be provided.

As can be seen from FIG. 2, a first face 44 of the reinforcing element 14 may be covered completely by the barrier film 12. Further, a face 46 of the reinforcing element 14 remote from the first face 44 is completely covered by the support structure 16.

In the variant of FIG. 2, the reinforcing element 14 is accordingly completely embedded between the barrier film 12 and the support structure 16 and thus protected from environmental influences. This equally applies to the reinforcing element 34 of the half-shell 10, which is likewise completely enclosed by the support structure 36 and the barrier film 32.

In the following, the method according to the invention is described with reference to FIGS. 3, 4, 5 and 6.

Figure 3:
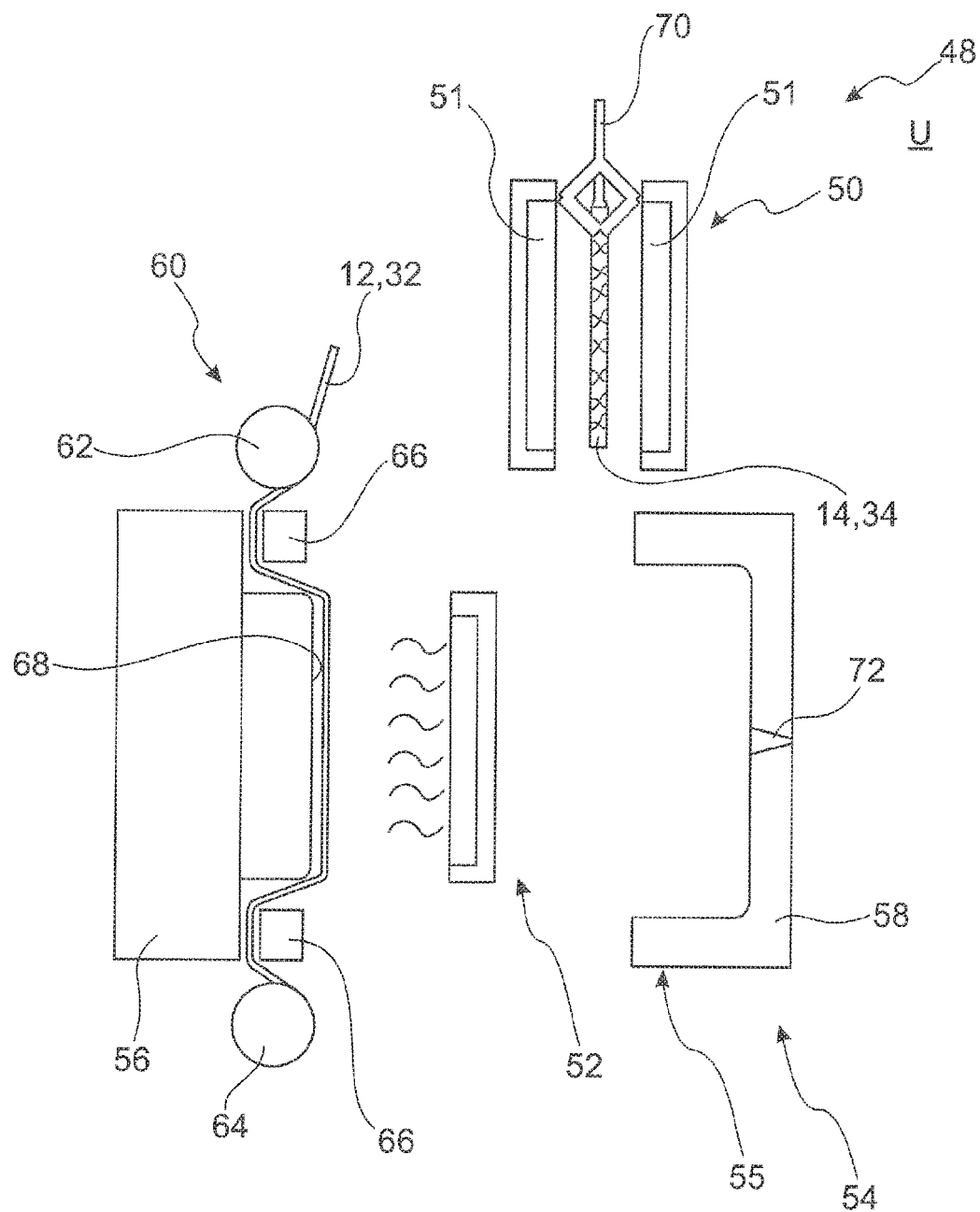
FIG. 3 shows a method step of the method according to the invention.
Figure 4:
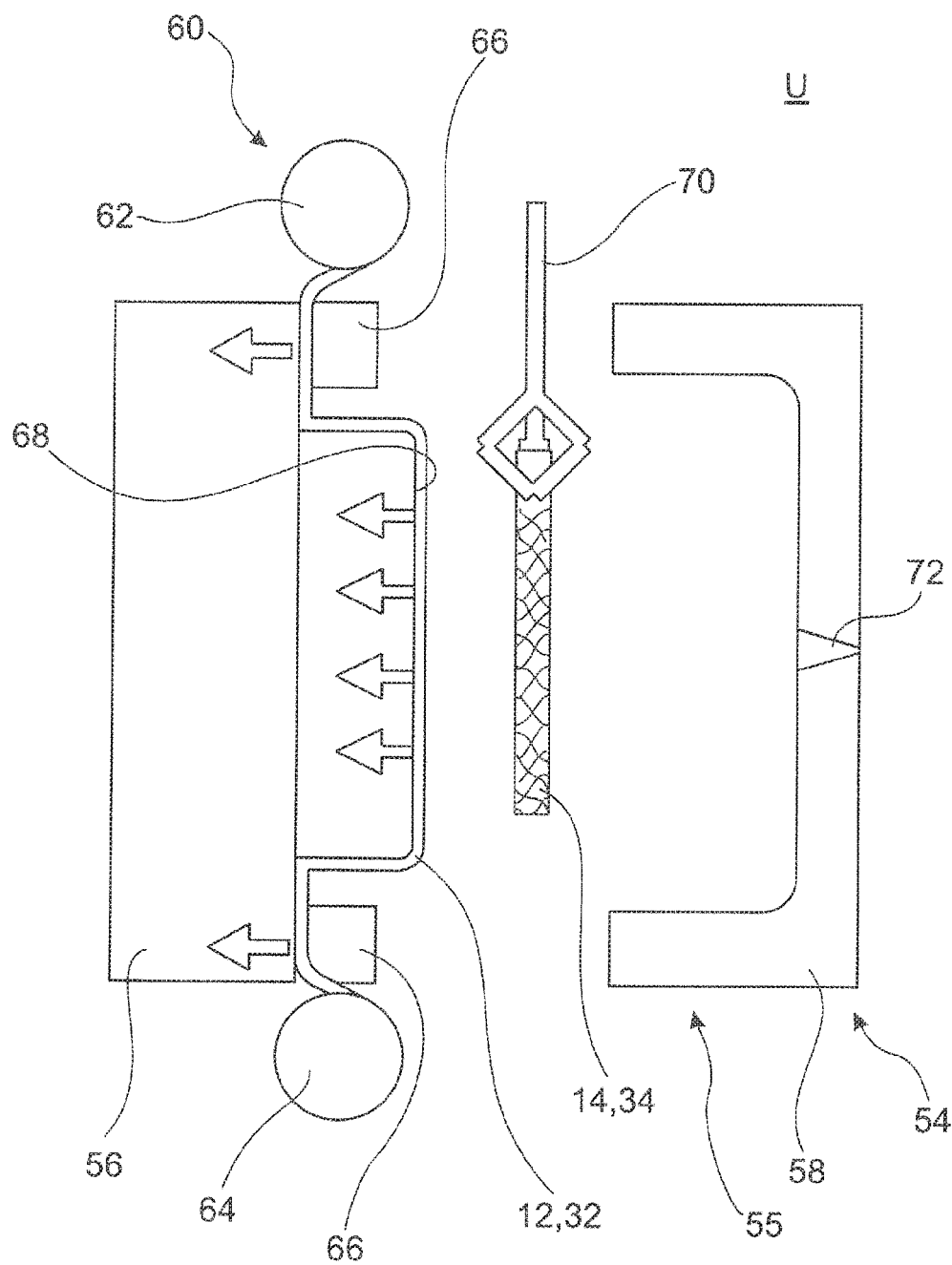
FIG. 4 shows a further method step of the method according to the invention.

FIG. 3 shows a device 48 for producing a liquid container 2 or 38 according to the invention, as shown for example in FIGS. 1 and 2.

The device 48 has a first heating device 50 and a second heating device 52. The device 48 additionally has an injection-molding device 54 comprising an injection mold or injection-molding tool 55, which has a first mold half 56 and a second mold half 58, which may also synonymously be referred to as tool halves 56, 58.

The device 48 further has a roll-to-roll film feed-in 60. The film feed-in 60 has a first roll 62 and a second roll 64, which are each arranged laterally with respect to the injection-molding tool 55 or laterally with respect to the first mold half 56 of the injection-molding tool 55.

During the production of a liquid container 2, 38 according to the invention, a barrier film 12, 32 and a reinforcing element 14, 34 for producing a first half-shell 8 or a second half-shell 10 are initially provided. The barrier film 12, 32 and the reinforcing element 14, 34 may be provided simultaneously or in temporal succession.

When the barrier film 12, 34 is provided, the barrier film 12 is initially positioned and fixed in the injection-molding tool 55 formed from the mold halves 56, 58 using the roll-to-roll film feed-in 60. The barrier film 12, 32 can be fixed with respect to the first mold half 56 using sealing elements 66.

The barrier film 12, 32 is heated using the heating device 52. The heating device 52 is a contactless heating device in the form of an infrared radiator 52.

Simultaneously, the reinforcing element 14, 34 is heated using the heating device 50, which likewise has infrared radiators 51.

In the next method step, the barrier film 12, 32 is thermoformed against a tool surface 68 of the first mold half 56, in such a way that the barrier film 12, 32 is brought into the provided shape by thermoforming. The heated reinforcing element 14, 34 is moved between the mold halves 56, 58 using a holding device 70.

The barrier film 12, 32 is thermoformed by producing a vacuum in the region of the tool surface 68, this being made possible in that the mold half 56 is formed at least partially from a porous, air-permeable material. In this context, the barrier film 12, 32 positioned against the mold half 56 is sealed from the environment U against the tool surface 68 using the sealing elements 66, making reliable, vacuum-based thermoforming of the barrier film 12, 32 possible.

Figure 5:
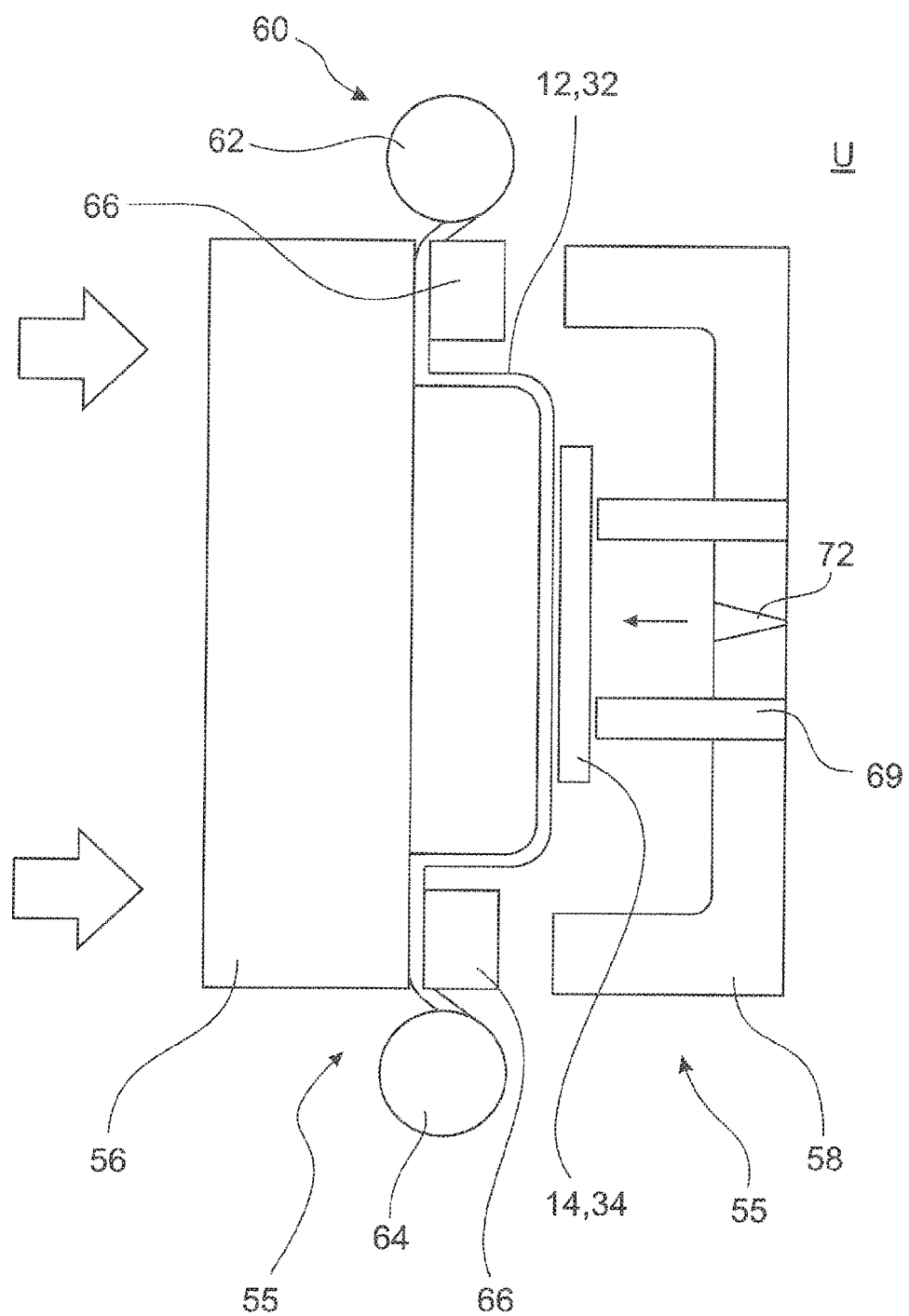
FIG. 5 shows a further method step of the method according to the invention.
Figure 6:
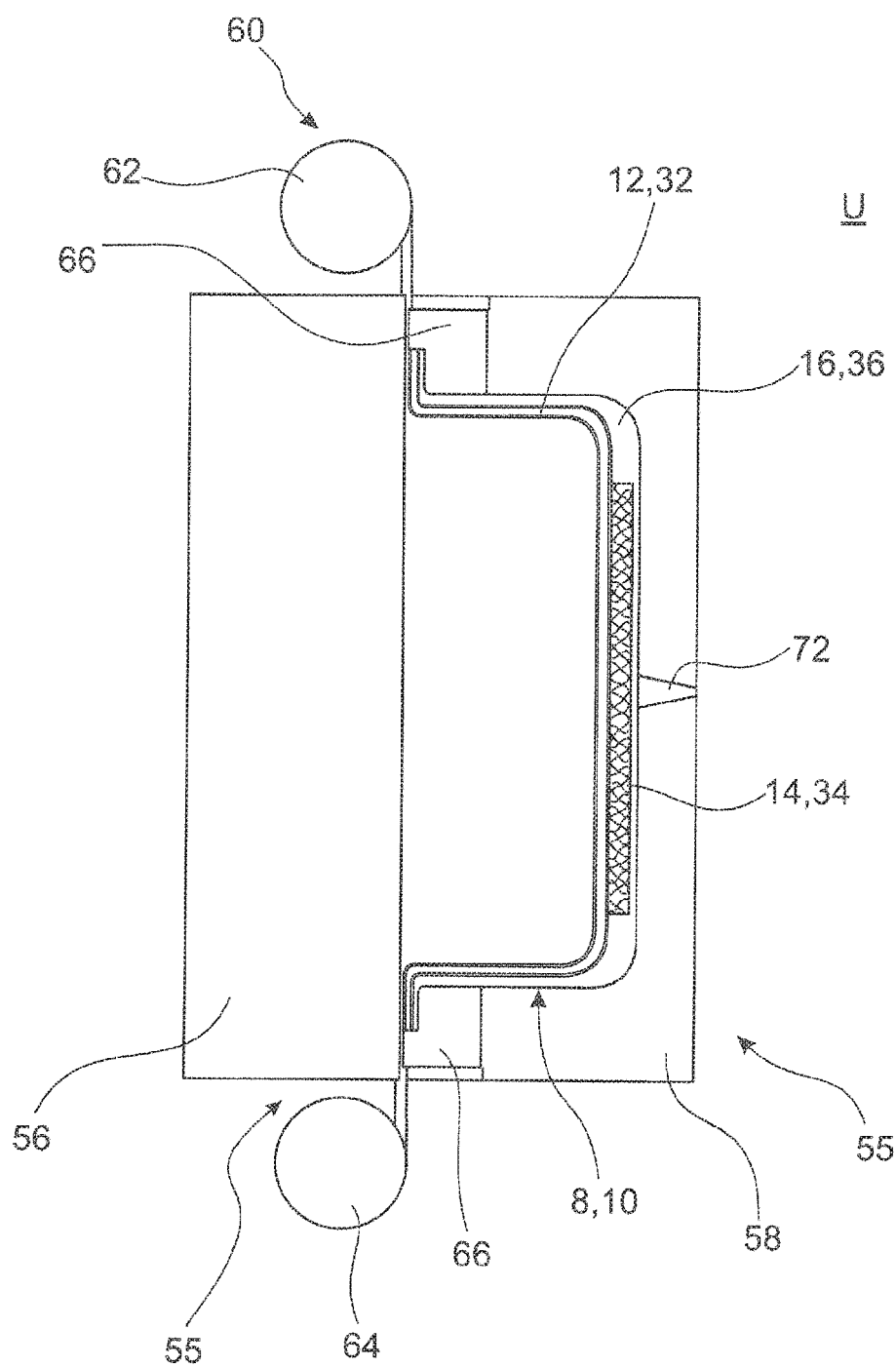
FIG. 6 shows a further method step of the method according to the invention.

The reinforcing element 14, 34 positioned between the mold halves 56, 58 is in the heated state and is pressed against the barrier film 12, 32, which is likewise heated from the preceding thermoforming, so as to weld and thus integrally connect the reinforcing element 14, 34 to the barrier film 12, 32. The reinforcing element 14, 34 is pressed onto the barrier film 12, 32 using a pressing device 69 (FIG. 5).

After the mold halves 56, 58 are closed, the support structure 16 or 36 is molded onto the reinforcing element 14, 34 and the barrier film 12, 32 via an opening 72. After the injection molding process, the half-shell 8, 10 produced in this manner can be removed from the injection-molding tool 55 and welded to a further, analogously produced mold half 8, 10 to form a plastics material fuel container 2, 38 according to the invention.

REFERENCE NUMERALS

2 Liquid container/plastics material fuel container
4 Storage volume
6 Liquid/fuel
8 First half-shell
10 Second half-shell
12 Barrier film
U Environment
14 Reinforcing element
16 Support structure
Z Detail
18 Reinforcing fibers/glass fibers
20 Plastics material matrix
22 Cover layer
24 Cover layer
26 Central layer
28 Curved transition
30 Side wall
32 Barrier film
34 Reinforcing element
36 Support structure
38 Liquid container/plastics material fuel container
40 Connection region
42 Encircling collar
44 First face
46 Remote face
48 Device
50 First heating device
51 Infrared radiator
52 Second heating device
54 Injection-molding device
55 Injection-molding tool
56 First mold half/first tool half
58 Second mold half/second tool half
60 Film feed-in
62 First roll
64 Second roll
66 Sealing element/holding frame
68 Tool surface
69 Pressing device
70 Holding device
72 Opening

What is claimed is:

1. A method for producing a liquid container, comprising:
providing a barrier film;
providing a reinforcing element, which is formed at least partially or completely of a thermoplastic fiber-reinforced composite material;
integrally and directly bonding the barrier film to the reinforcing element;
injection-molding a support structure, the support structure being integrally and directly bonded to the reinforcing element and the support structure being integrally and directly bonded to the barrier film,
the barrier film, the reinforcing element and the support structure being distinct components of the liquid container, and
the support structure at least partially covers a face of the reinforcing element which faces away from the barrier film.

2. The method according to claim 1, wherein providing the barrier film comprises the following steps:
thermoforming the barrier film;
positioning and fixing the barrier film in an injection-molding tool; and
the barrier film being thermoformed before the barrier film is positioned in the injection-molding tool and/or after the barrier film is positioned in the injection-molding tool.

3. The method according to claim 2, wherein:
the barrier film is positioned in the injection-molding tool using a roll-to-roll feed-in; and/or
the barrier film is fixed to the injection-molding tool using a holding frame; and/or
the barrier film is fixed and thermoformed by generating a negative pressure in the injection-molding tool.

4. The method according to claim 1, wherein integrally and directly bonding the barrier film to the reinforcing element comprises the following steps:
heating the reinforcing element to a temperature greater than or equal to a melting point of a plastics material matrix of the reinforcing element;
the reinforcing element being heated before and/or during the provision of the barrier film;
moving the reinforcing element into a region between a first tool half that receives the barrier film and a second tool half,
the reinforcing element being moved between the tool halves during or after the heating; and
integrally and directly bonding the reinforcing element to the barrier film by pressing the heated reinforcing element against a face of the barrier film remote from the first tool half.

5. The method according to claim 4, wherein:
when the heated reinforcing element is pressed on, the barrier film has a residual heat from preceding thermoforming of the barrier film; and/or
the barrier film is heated by a heating device before the heated reinforcing element is pressed on.

6. The method according to claim 4, wherein:
the second tool half is a nozzle-side tool half.

7. The method according to claim 4, wherein:
the support structure completely covers the face of the reinforcing element which faces away from the barrier film.

8. A liquid container for a motor vehicle, comprising:
a storage volume for storing a liquid; and
at least one shell, which at least partially delimits the storage volume, wherein
the shell has been produced at least partially in an injection molding process,
the shell has a barrier film,
the shell has a reinforcing element, which is formed at least partially or completely of a thermoplastic fiber-reinforced composite material,
the shell has a single-part or multi-part support structure, which is formed at least partially or completely of an injection-molded material,
the barrier film, the reinforcing element and the support structure being distinct components of the shell,
the barrier film is integrally and directly bonded to the reinforcing element,
the barrier film and the reinforcing element are each integrally and directly bonded to the support structure, and the support structure at least partially covers a face of the reinforcing element which faces away from the barrier film.

9. The liquid container according to claim 8, wherein:
the reinforcing element is arranged, at least in portions or completely, between the barrier film and the support structure; and/or
the barrier film partially or completely covers a face of the reinforcing element.

10. The liquid container according to claim 8, wherein:
the shell is a first half-shell, which together with a second half-shell delimits the storage volume; and
the second half-shell has a wall construction comprising a barrier film, a reinforcing element and a support structure.

11. The liquid container according to claim 8, wherein:
the reinforcing element has reinforcing fibers, which are embedded in a thermoplastic plastics material matrix, the reinforcing fibers comprising glass fibers and/or aramid fibers and/or carbon fibers; and/or
the reinforcing element has reinforcing fibers that are embedded in a thermoplastic plastics material matrix, the plastics material matrix comprising polyamide, polyolefin, polyurethane, polyphenylene sulfide; and/or
the reinforcing element comprises a fiber-reinforced composite plastics material reinforced with long fibers; and/or
with the support structure comprising high density polyethylene (HDPE) or a polyamide modified to be shock-resistant; and/or
the reinforcing element comprises an organic sheet; and/or
the reinforcing element comprises a unidirectionally reinforced strip.

12. The liquid container according to claim 8, wherein:
the support structure comprises the material nylon 6 (PA6), the reinforcing element comprises glass-fiber-reinforced PA6, and the barrier film has cover layers that comprise PA6, and the cover layers of the barrier film enclose a central layer of the barrier film, the central layer of the barrier film comprising ethylene vinyl alcohol (EVOH); or
the support structure comprises material HDPE, the reinforcing element comprises glass-fiber-reinforced HDPE, and the barrier film has cover layers that comprise HDPE, the cover layers of the barrier film enclosing a central layer of the barrier film, the central layer comprising EVOH, and an adhesion promotor layer of the barrier film being arranged between the central layer and an associated cover layer in each case, the adhesion promotor layers each comprising linear low density polyethylene (LLDPE); or
the support structure comprises the material HDPE, the reinforcing element comprises glass-fiber-reinforced PA6, and the barrier film has cover layers that comprise HDPE, the cover layers of the barrier film enclosing a central layer of the barrier film, the central layer comprising EVOH, and an adhesion promotor layer of the barrier film being arranged between the central layer and an associated cover layer in each case, the adhesion promotor layers each comprising LLDPE, and an adhesion promotor layer being provided between the reinforcing element and the barrier film and/or the reinforcing element and the support structure, the adhesion promotor layer comprising low density polyethylene (LDPE) or LLDPE.

13. The liquid container according to claim 8, wherein:
the reinforcing element is a substantially planar plate, which is part of a base-side or cover-side wall delimiting the storage volume;
the support structure forming a transition, curved at least in portions, from the base-side or cover-side wall to a side wall delimiting the storage volume; or
the reinforcing element is curved in one, two or three directions in space, in the manner of a free-form surface, and is part of a base-side or cover-side wall delimiting the storage volume.

14. The liquid container according to claim 8, wherein:
the support structure completely covers the face of the reinforcing element which faces away from the barrier film.

* * * * *